United States Patent
Naka et al.

(10) Patent No.: US 10,031,399 B1
(45) Date of Patent: Jul. 24, 2018

(54) TERAHERTZ WAVE GENERATOR

(71) Applicant: SHIBUYA CORPORATION, Kanazawa-shi, Ishikawa (JP)

(72) Inventors: Toshiaki Naka, Kanazawa (JP); Motoi Sasaki, Kanazawa (JP); Akito Tsuchiya, Kanazawa (JP)

(73) Assignee: SHIBUYA CORPORATION, Kanazawa-shi, Ishikawa (JP)

( * ) Notice: Subject to any disclaimer, the term of this patent is extended or adjusted under 35 U.S.C. 154(b) by 0 days.

(21) Appl. No.: 15/868,164

(22) Filed: Jan. 11, 2018

(30) Foreign Application Priority Data

Jan. 17, 2017 (JP) .................................. 2017-006110

(51) Int. Cl.
*G02F 1/39* (2006.01)
*G02F 1/35* (2006.01)

(52) U.S. Cl.
CPC .............. *G02F 1/39* (2013.01); *G02F 1/3501* (2013.01); *G02F 2001/3503* (2013.01); *G02F 2203/055* (2013.01); *G02F 2203/13* (2013.01)

(58) Field of Classification Search
CPC .. G02F 1/3501; G02F 1/39; G02F 2001/3503; G02F 2001/392; G02F 2203/13
See application file for complete search history.

(56) References Cited

U.S. PATENT DOCUMENTS

| | | | | |
|---|---|---|---|---|
| 5,751,472 A | * | 5/1998 | Jeys | G02F 1/39 359/326 |
| 7,710,637 B2 | * | 5/2010 | Ikari | G02F 1/39 359/330 |
| 9,742,145 B1 | * | 8/2017 | Huang | H01S 3/1083 |
| 9,897,893 B2 | * | 2/2018 | Kawase | G02F 1/3501 |

FOREIGN PATENT DOCUMENTS

JP          2002-072269 A       3/2002

* cited by examiner

*Primary Examiner* — Daniel Petkovsek
(74) *Attorney, Agent, or Firm* — Flynn, Thiel, Boutell & Tanis, P.C.

(57) ABSTRACT

A pumping beam L1 enters from a pumping beam projector 3 into one end surface 2a of a nonlinear crystal 2, the pumping beam L1 and idler wave L2 are generated from another end surface 2b of the nonlinear crystal 2. The pumping beam L1 emitted from the other end surface 2b of the nonlinear crystal 2 is reflected and re-enters as a pumping beam L1' into the other end surface 2b and the idler wave L2 generated from the other end surface 2b of the nonlinear crystal is reflected by the reflection optical system 6 and re-enters as a seed beam L2' into the other end surface 2b. The idler wave L2 enters as the seed beam L2' together with the pumping beam L1' into the nonlinear crystal and thus a terahertz wave with a large output and including a plurality of wavelengths can be generated.

4 Claims, 3 Drawing Sheets

TERAHERTZ WAVE GENERATOR

BACKGROUND OF THE INVENTION

Field of the Invention

The present invention relates to a terahertz wave generator and more particularly to a terahertz wave generator constituted to generate a terahertz wave by a parametric effect of a nonlinear crystal.

Description of the Related Art

Conventionally, as a terahertz wave generator, those including laser beam generating means for generating a pumping beam and a seed beam and a nonlinear crystal for generating a terahertz wave by a parametric effect when the pumping beam and the seed beam enter (Japanese Patent Laid-Open No. 2002-72269) are known.

In the aforementioned terahertz wave generator, by allowing the pumping beam and the seed beam to enter the nonlinear crystal, the terahertz wave can be generated with a pulse having a large peak output with a narrowed spectral width from the nonlinear crystal.

In the aforementioned Japanese Patent Laid-Open No. 2002-72269, a laser beam with a single wavelength is used for the pumping beam and the seed beam, respectively, and as a result, the terahertz wave is generated with a narrowed spectral width. In other words, the terahertz wave could not be generated with a wide wavelength band.

In view of such circumstances, the present invention provides a terahertz wave generator which can generate a terahertz wave with a large output in a wide wavelength band.

SUMMARY OF THE INVENTION

An invention (1) is a terahertz wave generator including a nonlinear crystal for generating a terahertz wave by a parametric effect when a seed beam and a pumping beam enter, characterized in that the terahertz wave generator includes:

pumping beam projecting means for allowing the pumping beam to enter from one end surface of the nonlinear crystal and emitting the pumping beam from the other end surface of the nonlinear crystal, and for generating an idler wave; and a reflection optical system for allowing the pumping beam emitted from the other end surface of the nonlinear crystal to be reflected and to re-enter the other end surface, and for allowing the idler wave generated from the other end surface of the nonlinear crystal to be reflected and allowing the idler wave as the seed beam to enter from the other end surface of the nonlinear crystal so as to generate terahertz wave.

An invention (2) is, in invention (1), characterized in that the reflection optical system includes a reflection mirror having a flat-plate shaped reflection surface facing the other end surface of the nonlinear crystal and a convex lens disposed between the reflection mirror and the other end surface of the nonlinear crystal, and the convex lens is disposed by being separated from the other end surface of the nonlinear crystal only by a focal distance of the convex lens.

An invention (3) is, in invention (1), characterized in that the reflection optical system includes a reflection mirror having a spherical-shaped reflection surface facing the other end surface of the nonlinear crystal, and the reflection mirror reflects the idler wave generated from the other end surface of the nonlinear crystal as the seed beam toward the other end surface of the nonlinear crystal.

An invention (4) is, in invention (2) or (3), characterized in that, between the other end surface of the nonlinear crystal and the reflection mirror, wavelength selecting means having a passing portion for passing the pumping beam and a passing portion for passing only the idler wave having a specific wavelength in the idler wave generated from the other end surface of the nonlinear crystal is provided.

According to invention (1), by allowing the pumping beam from the pumping beam projecting means to enter from the one end surface of the nonlinear crystal, the idler wave including a plurality of wavelengths can be generated from the other end surface of the nonlinear crystal and by allowing the pumping beam emitted from the other end surface of the nonlinear crystal to be reflected and to re-enter the other end surface and by allowing the idler wave including the plurality of wavelengths to be reflected and by allowing the idler wave to enter as the seed beam from the other end surface of the nonlinear crystal by the reflection optical system, a terahertz wave having a large output and including a plurality of wavelengths can be generated from the nonlinear crystal.

Therefore, in a case where the terahertz wave is passed through or reflected by a test object so as to test components and the like of the test object, for example, since the terahertz wave has a wide wavelength band, the components and the like of the test object can be tested at one time as compared with the case of projecting the terahertz wave with individual wavelengths to the test object.

Moreover, since the terahertz wave generated from the nonlinear crystal is emitted at an angle different for each of the wavelengths, spectral analysis is facilitated. That is, when a test is conducted with terahertz wave with a plurality of mixed wavelengths, the terahertz wave needs to be separated for each wavelength on a receiving side, but according to the present invention, such an operation can be omitted.

Moreover, according to invention (4), since only the idler wave with the specific wavelength in the idler wave including the plurality of wavelengths generated from the nonlinear crystal can be passed by the passing portion of the wavelength selecting means, without changing the wavelength of the idler wave itself generated from the nonlinear crystal, the terahertz wave with the specific wavelength can be generated by selecting/using only the idler wave with the specific wavelength by the wavelength selecting means.

DETAILED DESCRIPTION OF THE PREFERRED EMBODIMENTS

Figure 1:
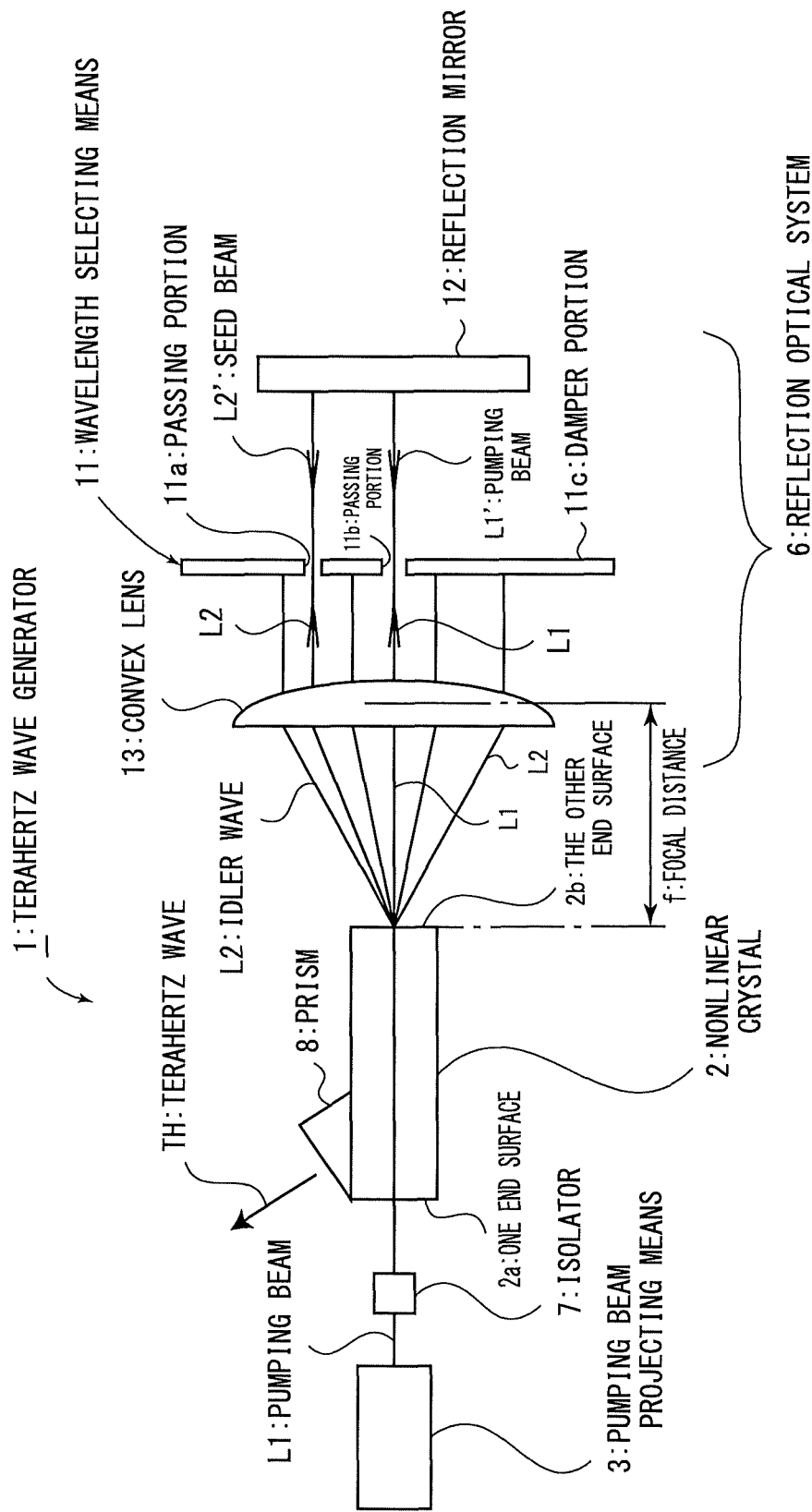
FIG. 1 is a layout view illustrating a first embodiment of the present invention.

The present invention will be described by referring to embodiments illustrated below, and in FIG. 1, a terahertz wave generator 1 includes a nonlinear crystal 2 for generating a terahertz wave by a parametric effect when a seed beam and a pumping beam enter. The nonlinear crystal 2 is formed having a cuboid shape.

Pump beam projecting means 3 for allowing a pumping beam L1 to enter the nonlinear crystal 2 is disposed on an optical axis of the nonlinear crystal 2 in the illustrated embodiment. For the pumping beam projecting means 3, a semiconductor laser oscillating a pulse laser can be used, and the pulse laser as the pumping beam L1 oscillated from the pumping beam projecting means 3 enters the nonlinear crystal 2 from one end surface 2a thereof, passes through the nonlinear crystal 2 and is emitted from the other end surface 2b.

As the wavelength of the pumping beam L1, a wavelength of 1064.4 nm, for example, can be used.

When the pumping beam L1 enters the nonlinear crystal 2 from on an optical axis thereof, the pumping beam L1 is emitted from the other end surface 2b of the nonlinear crystal 2 to on the optical axis, and two idler wave L2, L2 are generated from the other end surface 2b symmetrically by sandwiching the optical axis.

A sectional shape of the idler wave L2, L2 generated from the nonlinear crystal 2 is a substantially elliptic shape which is laterally longer in a direction perpendicular to the paper surface of FIG. 1. The idler wave L2, L2 have a spectral width with a wide wavelength band of 1069 to 1077 nm, for example, and are spatially separated for each wavelength, but the output is weak.

The pumping beam L1 transmitted through the nonlinear crystal 2 and one of the idler wave L2 generated in the nonlinear crystal 2 are reflected in the reflection optical system 6, respectively, and the reflected pumping beam L1 as a pumping beam L1' and the idler wave L2 as a seed beam L2' are constituted to enter the nonlinear crystal 2, respectively, at the same angle as the respective emission angles. Moreover, the other idler wave L2 is constituted to be absorbed by a damper portion 11c of wavelength selecting means 11 which will be described later in detail.

As described above, the pumping beam L1' and the seed beam L2' reflected by a reflection mirror 12 are constituted to enter the nonlinear crystal 2 at the same angle as the respective emission angles and thus, they automatically enter the nonlinear crystal 2 in a state satisfying a phase matching condition for the nonlinear crystal 2.

Moreover, by allowing the pumping beam L1' and the seed beam L2' to enter the nonlinear crystal 2, a light-injection type terahertz parametric generator (Is-TPG) for generating terahertz wave TH is constituted.

Since the idler wave L2 has a wide wavelength band, the seed beam L2' incident to the nonlinear crystal 2 also has a wide wavelength band and thus, since the pumping beam L1' enters the nonlinear crystal 2 together with the seed beam L2' with a wide wavelength band, the nonlinear crystal 2 generates the terahertz wave TH with a large output and a wide wavelength band or a wavelength band of 1 to 3 THz, for example.

At this time, in order to prevent the pumping beam L1' having been transmitted through the nonlinear crystal 2 from returning to the pumping beam projecting means 3, an isolator 7 is provided on the optical axis between the one end surface 2a of the nonlinear crystal 2 and the pumping beam projecting means 3. That is, the isolator 7 allows transmission of the pumping beam L1 but prevents transmission of the pumping beam L1' in an opposite direction.

In FIG. 1, reference numeral 8 denotes a prism for taking out the terahertz wave TH from the nonlinear crystal 2.

The reflection optical system 6 has a reflection mirror 12 having a flat-plate shaped reflection surface disposed by facing the other end surface 2b of the nonlinear crystal 2 so as to be perpendicular to its optical axis and a convex lens 13 disposed between the reflection mirror 12 and the other end surface 2b of the nonlinear crystal 2, and the convex lens 13 is disposed at a position separated away from the other end surface 2b of the nonlinear crystal 2 only by a focal distance f of the convex lens 13.

Therefore, the pumping beam L1 emitted on the optical axis thereof from the other end surface 2b of the nonlinear crystal 2 is transmitted on the optical axis of the convex lens 13 and is reflected by the reflection mirror 12, transmitted on the optical axis of the convex lens 13 again and enters as the pumping beam L1' into the other end surface 2b of the nonlinear crystal 2 from on the optical axis.

On the other hand, regarding the idler wave L2 emitted from the other end surface 2b of the nonlinear crystal 2, since the convex lens 13 is disposed at a position separated away from the other end surface 2b of the nonlinear crystal 2 only by the focal distance f of the convex lens 13, it is refracted so as to be in parallel with the optical axis of the nonlinear crystal 2 when it is transmitted through the convex lens 13 and is reflected by the reflection mirror 12 on the same optical axis.

Then, the idler wave L2 reflected on the same optical axis is refracted again when it is transmitted through the convex lens 13 and enters as the seed beam L2' into the other end surface 2b of the nonlinear crystal 2 at the same angle as that of the idler wave L2 emitted from the other end surface 2b of the nonlinear crystal 2.

As a result, the terahertz wave TH generated in the nonlinear crystal 2 has a large output and a wide wavelength band as described above.

By allowing the terahertz wave TH output from the nonlinear crystal 2 transmitted through or reflected by a test object such as a container, an envelope or a biological sample, not shown, and by applying spectral analysis to a wavelength component absorbed by the test object from a test beam obtained by that, the components, characteristics and the like of the test object can be tested. At that time, since the terahertz TH has a wide wavelength band, the test beam also has a wide wavelength band and thus, the components and the like of the test object can be tested at one time by the terahertz wave TH with a wide wavelength band.

The terahertz TH output from the nonlinear crystal 2 has a wide wavelength band, but in the illustrated embodiment, it is constituted such that a terahertz wave TH1 with a narrow wavelength band can be selectively generated.

That is, in the illustrated embodiment, by providing the wavelength selecting means 11 for preventing the passing of a part of the beam between the reflection mirror 12 and the convex lens 13 and by providing a passing portion 11a such as a slit in a shielding plate of a rectangular thin plate shape constituting a body portion of the wavelength selecting means 11, it is constituted that transmission of only the idler wave L2 with the specific wavelength can be selected from the idler wave L2 having a wide wavelength band having passed through the convex lens 13.

The passing portion 11a has a laterally long shape elongated in a direction perpendicular to the paper surface of FIG. 1 so that substantially one wavelength can be selected, whereby passage of only the specific wavelength through the passing portion 11a is allowed from the idler wave L2 having a wide wavelength band, while passage of the other wavelengths can be shut off by the wavelength selecting means 11. The passing portion 11a has a laterally long shape elongated in the direction perpendicular to the paper surface of FIG. 1 because a sectional shape of the idler wave L2 is a substantially elliptic shape which is laterally long in the direction perpendicular to the paper surface of FIG. 1 as described above.

Furthermore, in the wavelength selecting means 11, a passing portion 11b allowing the transmission of the pumping beams L1, L1' is provided, and a damper portion 11c for absorbing the other idler wave L2 described above in the two idler wave L2, L2 generated from the other end surface 2b of the nonlinear crystal 2 is provided as described above.

As described above, by providing the passing portion 11a in the wavelength selecting means 11 so as to allow the passage of the idler wave L2 only with the specific wavelength, the seed beam L2' only with the specific wavelength can be allowed to enter the nonlinear crystal 2. As a result, the terahertz wave TH generated by the nonlinear crystal 2 also becomes the terahertz wave TH only with the specific wavelength depending on the seed beam L2' only with the specific wavelength.

When the wavelength of the terahertz wave TH is to be changed, it is only necessary to prepare a plurality of wavelength selecting means 11 with only the position of the passing portion 11a made different and to switch them, whereby the wavelength of the terahertz wave TH can be easily changed.

Figure 2:
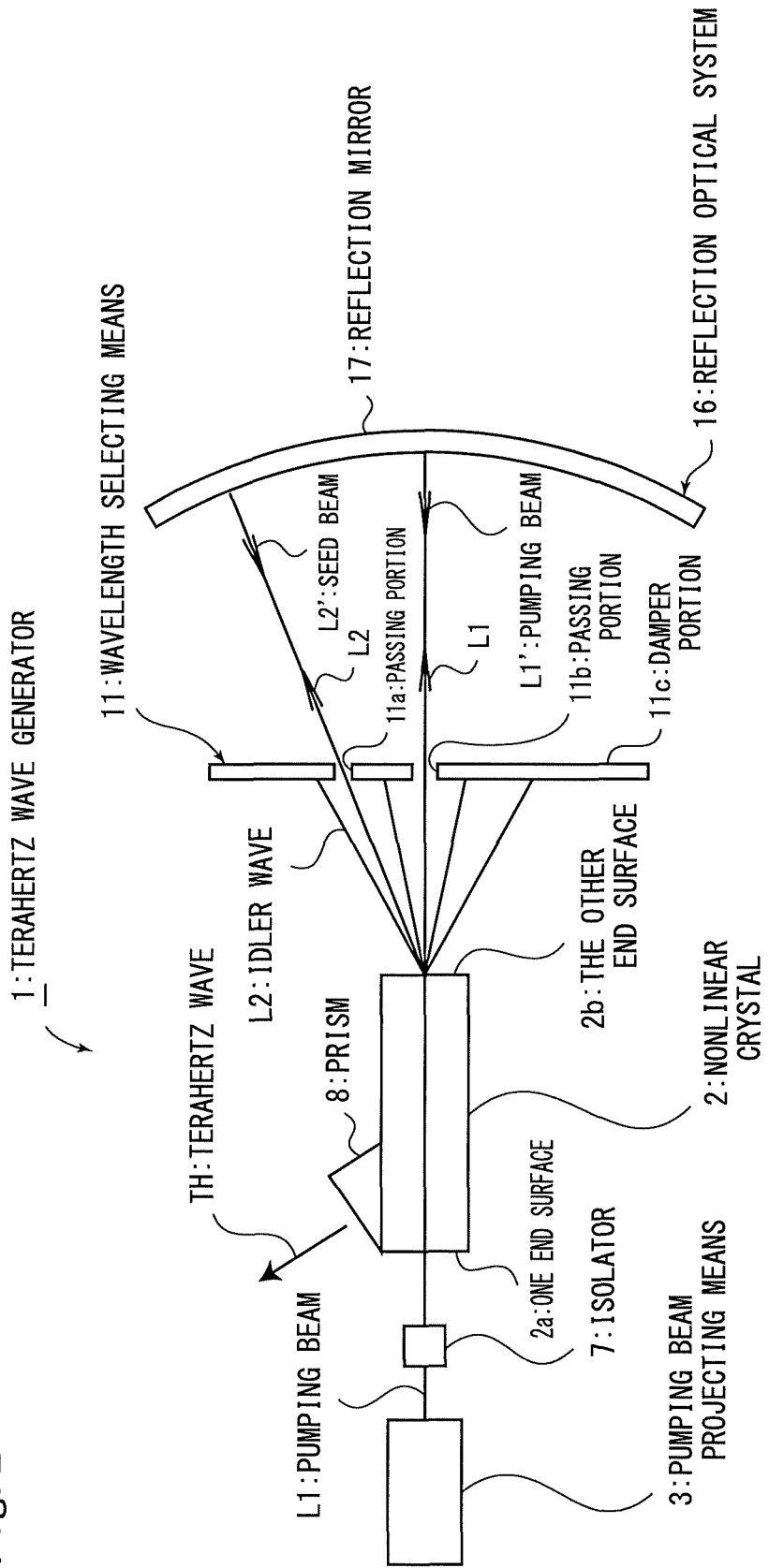
FIG. 2 is a layout view illustrating a second embodiment of the present invention.

FIG. 2 illustrates a second embodiment of the present invention, and in a reflection optical system 16 in this embodiment, instead of the reflection mirror 12 and the convex lens 13 in the reflection optical system 6 in the first embodiment, a reflection mirror 17 having a spherical-shaped reflection surface facing the other end surface 2b of the nonlinear crystal 2 is provided.

The reflection mirror 17 has a spherical-shaped reflection surface which can reflect the idler wave L2 generated from the other end surface 2b of the nonlinear crystal 2 toward the other end surface 2b of the nonlinear crystal 2 as the seed beam L2'.

Moreover, the reflection mirror 17 is constituted such that the pumping beam L1 emitted from the other end surface 2b of the nonlinear crystal 2 on the optical axis thereof is reflected and passed on the optical axis again so that it can enter as the pumping beam L1' into the other end surface 2b of the nonlinear crystal 2 from on the optical axis.

The spherical-shaped reflection mirror 17 is disposed, assuming that it has a curvature R of its reflection surface, a center point of the curvature is disposed at a distance L which corresponds to the other end surface 2b of the nonlinear crystal 2.

The other constitutions are similar to the constitution of the first embodiment, and the same reference numerals as those in FIG. 1 are given in illustration to the same or corresponding portions.

In the second embodiment with the aforementioned constitution, too, by means of the passing portion 11a provided in the wavelength selecting means 11, transmission of only the idler wave L2 with the specific wavelength can be selected from the idler wave L2 having a wide wavelength band and thus, the seed beam L2' only with the specific wavelength can be allowed to enter the nonlinear crystal 2. As a result, the terahertz wave TH generated by the nonlinear crystal 2 also becomes the terahertz wave TH only with the specific wavelength depending on the seed beam L2' only with the specific wavelength.

On the other hand, by leaving the damper portion 11c of the wavelength selecting means 11 and by omitting the other portions, the seed beam L2' having a wide wavelength band can be allowed to enter the nonlinear crystal 2 together with the pumping beam L1' and thus, the terahertz wave TH with a large output and having a wide wavelength band can be generated by the nonlinear crystal 2.

Figure 3:
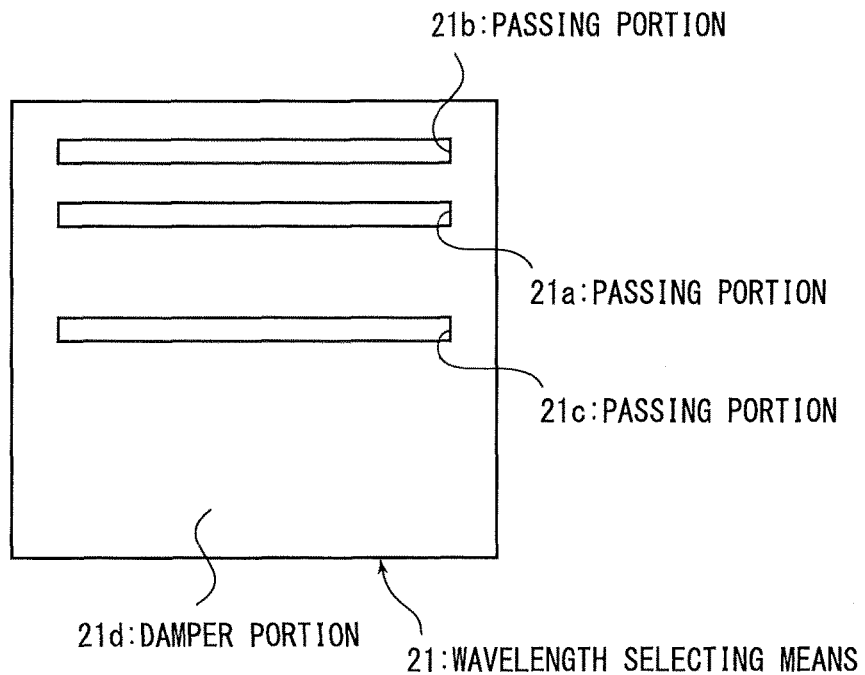
FIG. 3 is a front view illustrating another embodiment of wavelength selecting means 11 illustrated in FIG. 2.

FIG. 3 is another embodiment of the aforementioned wavelength selecting means 11, and in wavelength selecting means 21 in this embodiment, two passing portions 21a, 21b such as slits through which two different wavelengths are passed are provided.

Each of the passing portions 21a, 21b is formed having a laterally long shape elongated in the direction perpendicular to the paper surface of FIG. 1 similarly to the passing portion 11a in the first embodiment.

In this embodiment, too, the passing portion 21c allowing transmission of the pumping beams L1, L1' is provided, and a damper portion 21d is provided.

According to this embodiment, a terahertz wave TH with a large output and having two different wavelengths can be generated from the nonlinear crystal 2.

In this embodiment, the passing portions 21a, 21b may be provided in three or more.

Figure 4:
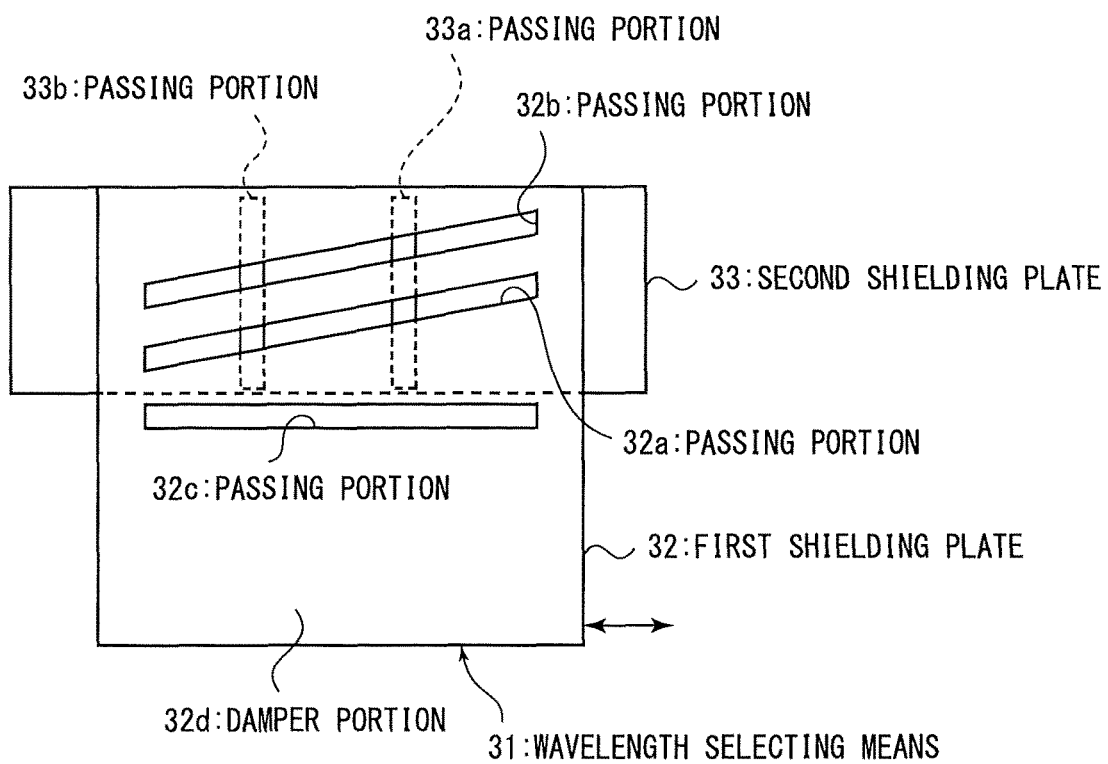
FIG. 4 is a front view illustrating still another embodiment of the wavelength selecting means 11 illustrated in FIG. 2.

FIG. 4 is still another embodiment of the aforementioned wavelength selecting means 11, 21, and in the wavelength selecting means 11, 21 in each of the aforementioned embodiments, when a different wavelength is to be selected, the wavelength selecting means 11, 21 need to be replaced with a wavelength selecting means having a passing portion allowing transmission of a required wavelength, but in this embodiment, the passing portion can be moved to a different wavelength direction so that the required wavelength can be selected without replacing the wavelength selecting means.

That is, the wavelength selecting means 31 of this embodiment is configured so that four different wavelengths can be selected and for that purpose, the wavelength selecting means 31 includes a first shielding plate 32 and a second shielding plate 33 overlapping it. One of them, that is, the first shielding plate 32 is provided movably by a member, not shown, to a right-left direction on the paper surface indicated by an arrow in FIG. 4 with respect to the reflection optical system 6 or 16, that is, in the direction perpendicular to the paper surface of FIG. 1, and two parallel optical passing portions 32a, 32b such as slits are formed in the first shielding plate 32 diagonally to the direction perpendicular to the paper surface of FIG. 1.

Moreover, in the first shielding plate 32, the passing portion 32c for the pumping beams L1, L1' and the damper portion 32d for the idler wave L2 are provided.

On the other hand, the other second shielding plate 33 is fixed to the first shielding plate 32 or the reflection optical system 6 or 16 by a member, not shown, and the second shielding plate 33, two parallel passing portions 33a, 33b such as slits are formed in a vertical direction of the paper surface of FIG. 4 (FIG. 1).

Moreover, the second shielding plate 33 is formed having an elongated rectangular shape as compared with the first shielding plate 32 so that it does not cover the passing portion 32c for the pumping beams L1, L1' formed in the first shielding plate 32.

By overlapping each of the passing portions 32a, 32b, 33a, and 33b, transmission of the idler wave L2 and the seed beam L2' is allowed only at the intersection of each of the passing portions.

According to this embodiment, the terahertz wave TH having four different wavelengths can be generated by four intersections of each of the passing portions 32a, 32b, 33a, and 33b.

When the wavelength to be selected is to be made different, it is only necessary to move the first shielding plate 32 to the arrow direction with respect to the second shielding plate 33, whereby positions of the intersections of each of the passing portions 32a, 32b, 33a, and 33b can be moved, and the wavelength to be selected can be made different.

In this embodiment, the number of the passing portions 32a and 32b provided in the first shielding plate 32 and the number of passing portions 33a and 33b provided on the second shielding plate 33 only need to be one or more, respectively.

REFERENCE SIGNS LIST 1 terahertz wave generator
2 nonlinear crystal
2a one end surface
2b the other end surface
3 pumping beam projecting means
6, 16 reflection optical system
11, 21, 31 wavelength selecting means
11b, 21c, 32c passing portion
11a, 21a, 21b, 32a, 32b passing portion
11c, 21d, 32d damper portion
12, 17 reflection mirror
13 convex lens
L1, L1' pumping beam
L2 idler wave
L2' seed beam
TH terahertz wave

What is claimed is:

1. A terahertz wave generator including a nonlinear crystal for generating a terahertz wave by a parametric effect when a seed beam and a pumping beam enter therein, characterized in that the terahertz wave generator comprises:

pumping beam projecting means for allowing the pumping beam to enter one end surface of the nonlinear crystal and emit the pumping beam from another end surface of the nonlinear crystal, and for generating an idler wave; and a reflection optical system for reflecting the pumping beam emitted from the another end surface of the nonlinear crystal to re-enter the another end surface, and for reflecting the idler wave generated from the another end surface of the nonlinear crystal as the seed beam to enter the another end surface of the nonlinear crystal so as to generate the terahertz wave.

2. The terahertz wave generator according to claim 1, characterized in that the reflection optical system includes a reflection mirror having a flat-plate shaped reflection surface facing the another end surface of the nonlinear crystal and a convex lens disposed between the reflection mirror and the another end surface of the nonlinear crystal, and the convex lens is separated from the another end surface of the nonlinear crystal only by a focal distance of the convex lens.

3. The terahertz wave generator according to claim 2, characterized in that between the another end surface of the nonlinear crystal and the reflection mirror, a wavelength selecting means is provided having a passing portion for passing the pumping beam and a passing portion for passing only the idler wave having a specific wavelength in the idler wave generated from the another end surface of the nonlinear crystal.

4. The terahertz wave generator according to claim 1, characterized in that the reflection optical system includes a reflection mirror having a spherical-shaped reflection surface facing the another end surface of the nonlinear crystal, and the reflection mirror reflects the idler wave generated from the another end surface of the nonlinear crystal as the seed beam toward the another end surface of the nonlinear crystal.

* * * * *